US012808717B2

(12) United States Patent
Gregory

(10) Patent No.: US 12,808,717 B2
(45) Date of Patent: Nov. 24, 2026

(54) MULTISPECTRAL IMAGE SENSOR

(71) Applicant: THE SECRETARY OF STATE FOR DEFENCE, Salisbury (GB)

(72) Inventor: Simon Adrian Gregory, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 304 days.

(21) Appl. No.: 18/682,847

(22) PCT Filed: Aug. 3, 2022

(86) PCT No.: PCT/IB2022/057200
§ 371 (c)(1),
(2) Date: Feb. 9, 2024

(87) PCT Pub. No.: WO2023/017366
PCT Pub. Date: Feb. 16, 2023

(65) Prior Publication Data

US 2024/0426663 A1 Dec. 26, 2024

(30) Foreign Application Priority Data

Aug. 12, 2021 (GB) ...................................... 2111592

(51) Int. Cl.
*G01J 3/28* (2006.01)
*G02B 5/20* (2006.01)
*H04N 23/55* (2023.01)

(52) U.S. Cl.
CPC ............ *G01J 3/2823* (2013.01); *G02B 5/201* (2013.01); *H04N 23/55* (2023.01); *G01J 2003/2826* (2013.01); *G02B 5/208* (2013.01)

(58) Field of Classification Search
CPC ............ G01J 3/2823; G01J 2003/2826; G01J 2003/2806; G01J 3/2803; G02B 5/201;
(Continued)

(56) References Cited

U.S. PATENT DOCUMENTS

2009/0323060 A1 12/2009 Knipp
2016/0142654 A1 5/2016 Vaillancourt

FOREIGN PATENT DOCUMENTS

CN 106847849 A * 6/2017 ............ B82Y 40/00
CN 110931519 A 3/2020
(Continued)

OTHER PUBLICATIONS

Machine Translation of CN 106847849 (Year: 2017).*
(Continued)

*Primary Examiner* — Tony Ko
(74) *Attorney, Agent, or Firm* — Kilpatrick Townsend & Stockton LLP

(57) ABSTRACT

A multispectral image sensor, and a method of use, is provided. The multispectral image sensor has a broadband image sensor and a spectral filter. The broadband image sensor has a plurality of pixels arranged in an array and the broadband image sensor has a plurality of filter elements arranged in an array. Each of the filter elements is coupled with one of more pixels. Each filter element has a passband in a receivable wavelength range of the broadband image sensor. Each filter element has a film with a negative value of permittivity in the passband of the filter element. The film has a plurality of holes, each hole having a dielectric material. The passband of at least two of the filter elements are different.

14 Claims, 6 Drawing Sheets

(58) Field of Classification Search
CPC .......... G02B 5/208; G02B 5/008; G02B 5/20; G02B 5/28; H04N 23/55; H04N 23/11; H04N 25/13; H10F 39/80; H10F 39/8053; H10F 77/337
See application file for complete search history.

(56) References Cited

FOREIGN PATENT DOCUMENTS

| | | | |
|---|---|---|---|
| EP | 3830535 | A1 | 6/2021 |
| WO | 2006130164 | A1 | 12/2006 |
| WO | 2014083326 | A1 | 6/2014 |

OTHER PUBLICATIONS

International Patent Application No. PCT/IB2022/057200, International Preliminary Report on Patentability mailed Feb. 22, 2024, 8 pages.

International Patent Application No. PCT/IB2022/057200, International Search Report and Written Opinion mailed Oct. 18, 2022, 11 pages.

United Kingdom Patent Application No. GB2111592.8, Search Report mailed Feb. 10, 2022, 1 page.

Pelzman et al., “A Plasmonic Subwavelength Aperture Array for Polarimetric and Multispectral Imaging,” 2015 IEEE Photonics Conference, Oct. 4, 2015, pp. 472-473, IEEE.

Reinhard et al., “Metamaterial-Based Photonic Devices for Terahertz Technology,” IEEE Journal of Selected Topics in Quantum Electronics, Jan./Feb. 2013, vol. 19, No. 1, 12 pages.

* cited by examiner

MULTISPECTRAL IMAGE SENSOR

TECHNICAL FIELD OF THE INVENTION

The present invention relates to the field of multispectral image sensors and to methods of using said image sensors.

BACKGROUND TO THE INVENTION

In the field of multispectral imagery, information captured from different wavebands, or spectral regions, can be used to determine different characteristics about an object or a scene of interest. This can be particularly advantageous for feature discrimination applications, such as, machine vision and automatic object recognition. For example, an object of interest which may be difficult to distinguish from background surroundings at optical wavelengths, may be readily distinguishable from sensor information obtained at the far-infrared portion of the electromagnetic spectrum.

Current approaches to capturing multispectral image information typically include the use of multiple detectors operating in different wavebands or the use of a scanning or static optical assembly, such as a grating or beam splitter, to image different bands at different times and/or on different parts of the same detector. However, such approaches often increases the size, weight, and complexity of the sensor assembly. These approaches may introduce difficulties in synchronising and combining the images, especially for features of objects/scenes which display rapid temporal variation.

An alternative known approach incorporates the use of spectral filters at the pixel level, for example, the use of a Bayer Colour Filter. This type of filter is generally considered to be more suitable for applications requiring the retention of temporal resolution, at the trade-off of spatial resolution. However, these types of filters generally incorporate dye-based spectral filters in the visible waveband, and these are not suitable for other wavebands. An alternative approach is to use dielectric Fabry-Perot filters, and these may be used in other wavebands, though they are primarily considered suitable for multispectral images where the information captured is from different wavebands having a narrow spectral separation. The manufacturing of such filters can be complex requiring multiple dye formulations or filter designs, with additional processing steps for each filter type.

It is therefore an aim of the present invention to mitigate one or more of these problems of the prior art. Thereby, providing a less complex means of obtaining spectral image information which is easy to adapt to different portions of the spectrum and is easier to manufacture.

SUMMARY OF THE INVENTION

According to a first embodiment of the invention, there is provided a multispectral image sensor comprising, a broadband image sensor comprising a plurality of pixels arranged in an array and a spectral filter comprising a plurality of filter elements arranged in an array, the spectral filter being mounted to the broadband image sensor such that each of the filter elements is coupled with one or more pixels of the broadband image sensor, each filter element having a passband in a receivable wavelength range of the broadband image sensor, wherein each filter element comprises a film having a negative value of permittivity in the passband of the said filter element, the film comprising a plurality of holes, wherein each hole comprises a dielectric material, and wherein the passband of at least two of the filter elements are different.

According to another embodiment of the invention, there is provided a camera comprising the multispectral image sensor according to the first embodiment.

According to a further embodiment of the invention, there is provided a method of producing a multispectral image of an object or a scene, the method comprising the steps of: providing a device according to the first embodiment of the invention; receiving a subject image of the object or scene using the spectral filter, the subject image comprising a plurality of image portions and each filter element receiving a corresponding image portion of the subject image; filtering the subject image using the spectral filter to produce a filtered subject image, the filtered subject image comprising a plurality of filtered image portions, each filter element filtering the corresponding image portion to produce a corresponding filtered image portion; receiving the filtered subject image using the broadband image sensor, each pixel receiving the corresponding filtered image portion filtered by the filtered element to which the pixel is coupled; forming a multispectral image of the object or scene comprising the filtered image portions of the filtered subject image; outputting the multispectral image of the subject.

The spectral filter incorporates a number of filter elements each comprising a film having a plurality of holes, each hole comprising a dielectric material. Each filter element is coupled with one or more pixels of the broadband image sensor. In use, the electromagnetic radiation incident upon the broadband multispectral image sensor is filtered by the filter elements. The contrast in permittivity between the film and the regions of the dielectric material contained within the cavities within the film result in tuneable resonances in incident radiation which result in the onward transmission of frequencies of interest. Each filter element is tuned to have a passband in the receivable wavelength range of the broadband image sensor. Electromagnetic radiation which is incident upon the spectral filter, and which is within the passband of a given filter element, is subsequently transmitted to those pixel(s) of the broadband image sensor which are coupled to said filter element. At least two of the filter elements have a different passband. Thereby, electromagnetic radiation of at least two different wavebands is receivable by at least two different pixels of the image sensor. A multispectral image may be formed from the different waveband information received by the pixels of the image sensor.

Advantageously, each filter element maybe tuned to have a single passband in the receivable wavelength range of the broadband image sensor. Films comprising holes containing a dielectric material can be readily tuned to transmit a selected portion of electromagnetic radiation from across a broad band of the electromagnetic spectrum. Additionally, such films may be easily configured such that undesirable higher order passbands are outside of the receivable wavelengths of the broadband image sensor. Thereby, the present invention may be particularly advantageous in enabling multispectral image information to be captured using a broadband image sensor without undesirable breakthrough signals from unwanted higher order modes.

The passband of the filter elements are readily tuneable by selecting one or more physical parameters. For instance, the passband of the filter elements of the present invention are readily tuneable by controlling one or more of the size, shape and/or spacing of the holes. Alternatively, or additionally, the passband(s) of the filter elements may be selected by controlling one or more of the material of the film, the thickness of the film and/or the material of the dielectric. This is in contrast to other known techniques, such as Bayer Colour Filters comprising dye-based spectral filters which require complex reformulation of different chemical dye elements.

Films comprising holes housing dielectric materials do not require complex optical arrangements or moving parts in order to function. Such filter elements may be cheaper and easier to manufacture and/or maintain than systems requiring multiple sensors, a number of different dye formulations or complex optics. Known systems containing moving parts can suffer from vibrations particularly in applications where the sensor is incorporated into a moving platform or vehicle. Such vibrations may result in a degradation of performance. Therefore, the invention of the present system, which does not require moving parts, can be particularly advantageous for applications requiring the sensor to be mounted or incorporated into a moving platform such as an aeroplane, unmanned aerial vehicle, water vessel, or a land-based vehicle.

The spectral filter may comprise a single film. Forming the plurality of filter elements from a single film is less complex than arrangements incorporating a number of separate filter elements.

The film is formed from a material having a negative value of permittivity in the passband of the filter element. For instance, the film may be a metal film. In particular, the film may be a plasmonic metal such as, but not limited to, gold, silver or aluminium. The film may be formed from an optical metal, where the permittivity is negative in the frequency of interest. For example, the film may be formed from indium tin oxide (ITO). Optionally, the film may be formed from a doped semi-conductor.

The thickness of the metal film may be selected to control the wavelengths of the passband. Preferably the thickness of the film is selected such that the film is opaque in the frequency of the passband. For instance the thickness of the metal film may be in the range 20 nm to 200 nm, or more particularly within the range of 20 nm to 100 nm. Advantageously the thickness of the metal film may be selected to reduce the complexity of the manufacturing process used to form the holes. For example, the holes may be formed by etching.

The films of the present invention are compact. They are typically have limited effect on the weight and size of the image sensor. Filters formed from films may be readily mountable onto image sensors.

The film comprises a plurality of holes, each hole comprising a dielectric material. Thereby, each hole forms a region in the film comprising a dielectric material. For example, the holes may be through holes wherein said through holes are filled with a dielectric fluid, such as, air.

The film(s) may be manufactured in a single patterning step. This may be particularly advantageous where the holes are through holes. This is in contrast to the generally more complicated fabrication methods of alternative technologies.

To detect spectrally separated bands using a single image sensor, the receivable wavelength range of the image sensor must be at least as broadband as the separation between the highest and lowest wavelengths of interest. The broader the band of the image sensor, the more likely any higher order modes of a filter element are to fall within the operating range of the sensor. These higher order modes of the filter elements may otherwise result in unwanted secondary passbands causing unwanted noise signal(s) being received by the pixel(s) of the image sensor. This may result in a loss of spectral selectivity. The higher order modes of the filter elements of the present invention are readily tuneable to be outside the receivable wavelengths of an image sensor having a broadband operating range. Thereby, the broadband multispectral image sensor of the present invention is particularly advantageous in enabling such spectral filters to be used in combination with a broadband image sensor whilst limiting or eliminating unwanted signals from higher order resonance modes. For instance, this may be particularly advantageous for applications requiring detection of two or more bands spectrally separated across a broad bandwidth.

Optionally, one or more of the size, shape and/or spacing of the holes, may be selected such that the higher order modes of filter elements are outside of the receivable wavelength range of the broadband image sensor. Alternatively or additionally, one or more of the material of the film and/or the material of the dielectric may be selected such that the higher order modes of filter elements are outside of the receivable wavelength range of the broadband image sensor.

The multispectral image sensor of the present invention may enable the detection of signals having a broadband spectral separation. For instance, the multispectral image sensor may be a broadband multispectral image sensor. The passbands of the at least two different filter elements may have a wide spectral separation. For instance, the passbands of at least two of the filter elements may have a broadband separation. The passbands of the at least two of the filter elements may differ by one or more octaves. Preferably, the spectral separation of the at least two filter elements may be greater than or equal to one and a half octaves. For instance, the spectral separation of the passbands of at least two of the filter elements may be greater than or equal to two octaves. A wide spectral separation between the passbands of at least two of the filter elements may be particularly advantageous. For example, broadband spectral separation between the passbands of the filter elements enables sensing of multispectral images comprising spectrally distant characteristics. This may be particularly advantageous of the detection and/or discrimination of features that do not vary significantly over a short spectral interval. For example, this may be particularly useful for geological surveying where characteristic features of a geological surface may span optical as well as the near, mid and/or far infrared. The film of the present invention is readily tuneable by selecting one or more physical parameters, thereby the film is especially suited to the formation of filter elements having widely separated passbands.

Advantageously, the passbands of at least two of the filter elements may be separated by the operating range of the image sensor. Thereby, the multispectral image sensor may maximise the signal detection range of the broadband image sensor.

Optionally, the receivable wavelength range of the broadband image sensor may be between one to five octaves. Optionally, the receivable wavelength range of the broadband image sensor is one or more octaves. For instance, the receivable wavelength range of the broadband image sensor may be two or more octaves. Preferably, the operating range of the broadband image sensor may comprise both optical and infrared wavelengths.

Optionally, the passband of at least one of the filter elements may comprise optical wavelengths. Optionally, the passband of at least one of the filter elements may comprise infrared wavelengths. For instance, the passband of at least one of the filter elements may be far infrared wavelengths, mid infrared wavelengths or alternatively near infrared wavelengths. Optionally, the receivable wavelength range of the broadband image sensor may be five octaves. Preferably, the passband of one of the filter elements may comprise optical wavelengths and the passband of one of the filter elements may comprise infrared wavelengths.

The image senor may be any suitable image sensor comprising a plurality of photo sensor cells, or pixels. For instance, the image sensor may be a charge-coupled device (CCD) or an active-pixel sensor (CMOS sensor), or a bolometer-type sensor.

Optionally, the receivable wavelength range of the broadband image sensor may have the range from mid-wavelength infrared to the long-wavelength infrared. For instance, the receivable wavelength range may be 2 μm-14 μm, or optionally 3 μm-13 μm, or optionally 2 μm-12 μm. For example, a Mercury Cadmium Telluride image sensor may be particularly advantageous. Mercury Cadmium Telluride sensors are known to operate in both the mid-wavelength infrared and the long-wavelength infrared.

The broadband image sensor is operable over a receivable range of wavelengths. The receivable wavelength range of the broadband image sensor may exclude atmospheric stopbands. Optionally, the receivable wavelength range over which the broadband image sensor operates may be modified by the atmospheric stopbands. For instance, the receivable wavelength range of the image sensor may exclude those portions of the electromagnetic spectrum within the atmospheric stopbands. In particular, the operable range of the image sensor may comprise a nominal spectral range which may be considered to be reduced by the atmospheric stop bands. For instance, one of more of any of the following may be selected such that the higher order modes of the fundamental spectral filter passbands fall within an atmospheric stopband, and/or outside the spectral operating range of the camera: the size, shape and/or spacing of the through holes of the filter elements and/or the thickness of the film and/or the material of the film and/or the thickness or material of the dielectric material.

The multispectral image sensor may further comprise an atmospheric stopband filter. The atmospheric stopband filter may be configured to prevent the transmission of one of more stopband frequencies. It is generally considered undesirable to use spectral bands in the regions of atmospheric absorption because these are highly variable. In particular, signal reception in these bands may depend on range, weather, and atmospheric conditions. Therefore, to disregard or, for example, to block atmospheric stopbands with an additional filter would typically be considered of no detriment to the performance of a sensor.

The atmospheric stopbands may comprise the wavelengths of radiation for which atmospheric absorption occurs due to, for instance, water and/or $CO_2$ absorption. The atmospheric stopbands may comprise the range 5.5-7.5 μm and/or the range 2.7-3 μm. The range 5.5-7.5 μm is typically associated with water absorption. The range 2.7-3 μm is typically associated with $CO_2$ absorption. The absorption bands formed as a consequence of water and $CO_2$ are typically significantly absorptive and therefore are particularly advantageous for modifying the receivable wavelength range of the broadband image sensor. There are a number of alternative/additional atmospheric stopbands associated with different molecular species present in the atmosphere which may be alternatively or additionally selected to modify the receivable wavelength range of the broadband image sensor.

The filter elements are arranged in an array. The spectral filter is mounted to the broadband image sensor such that each of the filter elements is coupled with one or more pixels of the broadband image sensor. For instance, the filter elements may be arranged in a grid. Optionally, each filter element may be coupled with a single pixel of the broadband image sensor. Each filter element may be coupled on a one-to-one basis with each pixel of the broadband image sensor. Thereby having a pixel-wise arrangement with respect to the pixels of the image sensor. This may be particularly advantageous for maximising the spatial resolution of the image sensor. Alternatively, each filter element may be coupled with a group of two or more pixels of the broadband image sensor.

The spectral filter may be physically mounted onto the broadband image sensor. Such a physically coupled arrangement may be particularly advantageous, for example, in providing for a compact arrangement.

The spectral filter may be optically mounted onto the broadband image sensor. Such an optically coupled arrangement may be particularly advantageous, for example, in permitting the replacement of spectral filters. For instance, the filters may be arranged on a different image plane to the broadband image sensor. The filtered image may then be projected on to the pixels of the broadband image sensor.

Optionally, the spectral filter may comprise two or more groups of the filter elements, wherein each of the filter elements within a group has a single passband and wherein the passband of each of the groups of filter elements is different. Having two or more groups, with each comprising a plurality of filter elements may be advantageous for achieving a good degree of spatial resolution for a given spectral region of interest. In particular, the greater the number of filter elements for a given passband, the greater the number of spatially separated pixels which may be available to receive signals for said passband.

Optionally, the filter elements within each group of filter elements may have a periodic arrangement within the array. The filter elements of each group may be equidistantly spaced within the array. This may be particularly advantageous for achieving a good degree of spatial resolution for signals within the passband of each of the different groups of filter elements. Optionally, the filter elements from each group may be alternately positioned within the array. Optionally, a sub-arrangement of filter elements comprising a filter element from each different group may be repeated across whole or part of the array.

Each of the filter elements may have a selected polarisation state. Detecting the polarisation state of the received signal may be particularly advantageous in determining the characteristics of an object or scene of interest. For example, in the field of geological surveying, the polarisation state of electromagnetic radiation reflected, transmitted and/or scattered by objects may provide information regarding the characteristics of an object or scene.

Advantageously one or more filter elements may comprise a spectral filter and a polarisation filter.

The polarisation state may be any suitable polarisation state of interest. For example, the polarisation state may be selected from 0 degrees, +45 degrees, −45 degrees, and/or 90 degrees.

Optionally, each of the filter elements may have a polarisation state, wherein the polarisation state of two or more of the filter elements are different. Having a spectral filter where two or more of the filter elements has a different polarisation state may be particularly advantageous for capturing multi-polarisation state image information. This may be particularly advantageous where the characteristics of the object or scene of interest may vary with detected polarisation state.

The shape of the holes in the film may be selected to control the polarisation state of the filtered electromagnetic radiation.

Advantageously, the shape, size and/or spacing of the holes may be selected to control both the passband and the polarisation state of the filter element. This provides for a design which may be particularly advantageous for reducing the structural and/or manufacturing complexity of the filter elements.

Optionally, the spectral filter may comprise two or more filter elements having the same passband but different polarisation states. For instance, the polarisation state of at least two of the filter elements within one or more of the group(s) of filter elements may be different. For example, each group of filter elements may comprise filter elements having at least two different polarisation states. This may be advantageous in enabling image information regarding different polarisation states to be obtained for each passband of interest. This may be particularly advantageous for applications where the polarisation state varies with wavelength.

Optionally, within each group of filter elements there may be an equal number of filter elements of each polarisation state. Where there are two polarisation states, 50 percent of the filter elements within each group may be of each of the polarisation states. Alternatively, where there are four polarisation states, 25 percent of the filter elements within each group may be of each of the polarisation states. An arrangement comprising a substantially equal number of filter elements of each polarisation state may be particularly advantageous for achieving a good degree of spatial resolution.

The filter elements having the same polarisation state may be periodically arranged within the array. Filter elements having the same polarisation state may be equidistantly spaced within the array. This may be particularly advantageous for achieving a good degree of spectral resolution for signals within each polarisation state. Optionally, the filter elements from each different polarisation state may be alternately positioned within the array. For example, an arrangement of filter elements comprising a filter element from each different polarisation state may be repeated across whole or part of the array.

The filter elements having the same polarisation state and the same passband may be equidistantly spaced within the array. This may be particularly advantageous for optimising the spatial resolution of both spectral and polarisation image information.

Optionally, each of the filter elements within a group may have a single polarisation state wherein the polarisation state of two or more of the groups may be different. For instance, the polarisation state of each filter element having a given passband may be the same, and the polarisation state of two or more of the groups having a different passband may be different. For instance, the polarisation state of each group of filter elements, having the same passband, may be different. This may be particularly advantageous for applications where the polarisation state is not anticipated to vary with wavelength. This may retain a greater degree of spatial resolution across both polarisation state and passband.

The holes of the film comprising a dielectric are resonators for a selected frequency, or frequencies, of electromagnetic radiation. The film is engineered to perform as a metamaterial, selecting the transmissible wavelengths and defining the passband of the filter element. Thereby, each filter elements has a resonant spectrum which results one or more passband(s). Each filter may have one or more stopband(s), in frequency ranges outside of the resonant spectrum of the filter element.

The spectral and/or polarisation properties of the filter elements may be defined by the selection of the geometry of the holes. Optionally, the size of the holes may be selected to control the wavelength(s) of the passband. The size of the holes may be selected within the range of one quarter and one half of the wavelength of operation. Optionally, or additionally, the spacing between the holes may be selected to control the wavelength(s) of the passband. Optionally, or additionally, the shape of the holes may be selected to control the wavelength(s) of the passband. Optionally, or additionally, the shape of the holes may be selected to control the polarisation state. For instance, the cross-section of the holes may be cross shaped. Alternatively, the shape of the holes may be longitudinal slots. Thereby, the orthogonal polarization is passed by the filter element. For example, the spectral band may be preserved by maintaining the hole size/spacing, and the polarization state may be changed by rotating the filter elements. The holes may be arranged in an array.

Optionally, the spectral filter may be cooled. Cooling the filter may reduce losses in the metal film. The passbands of the filter may become sharper, letting more light through on resonance, and less off-resonance. Thereby, cooling of the filter may improve performance.

BRIEF DESCRIPTION OF THE DRAWINGS

Embodiments of the invention will now be described by way of example only and with reference to the accompanying drawings, in which.

DETAILED DESCRIPTION

Figure 1A:
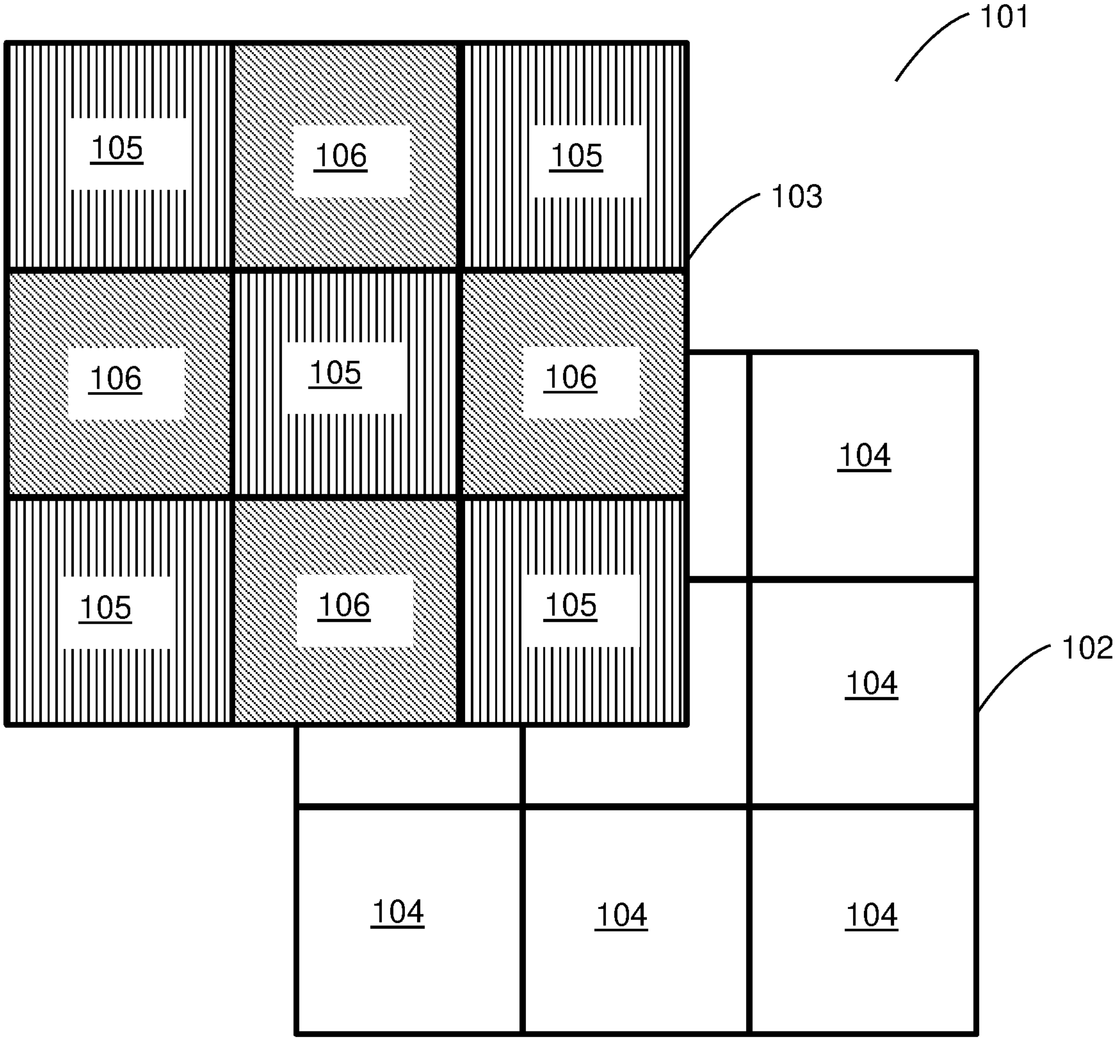
FIG. 1*a* shows an exploded plan view of a multispectral image sensor according to the first aspect of the invention.
Figure 1B:
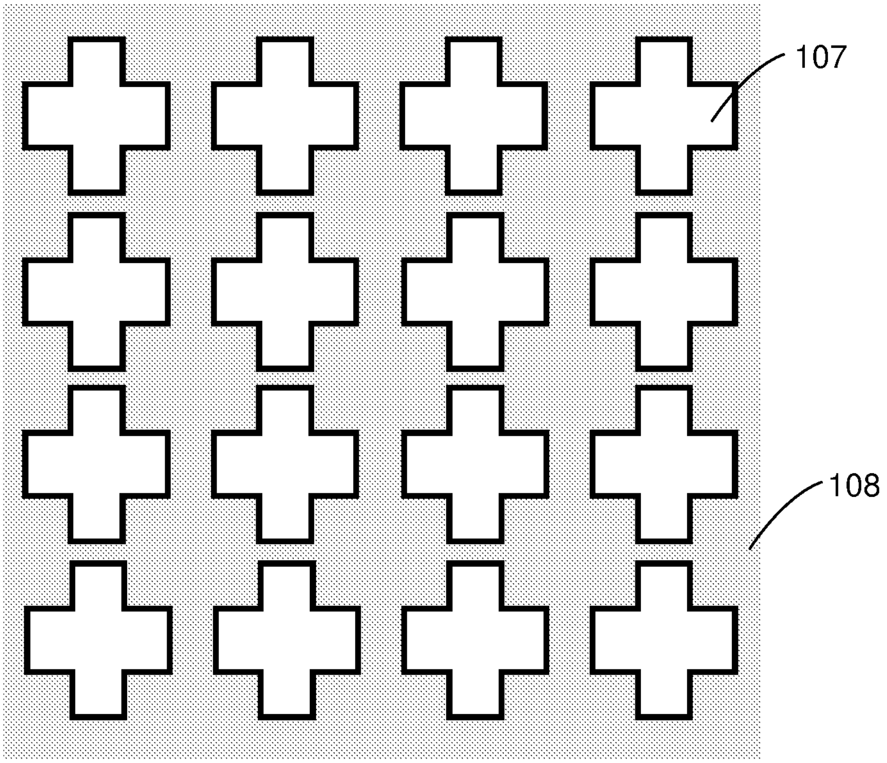
FIG. 1*b* shows a portion of a filter element of FIG. 1*a*.
Figure 1C:
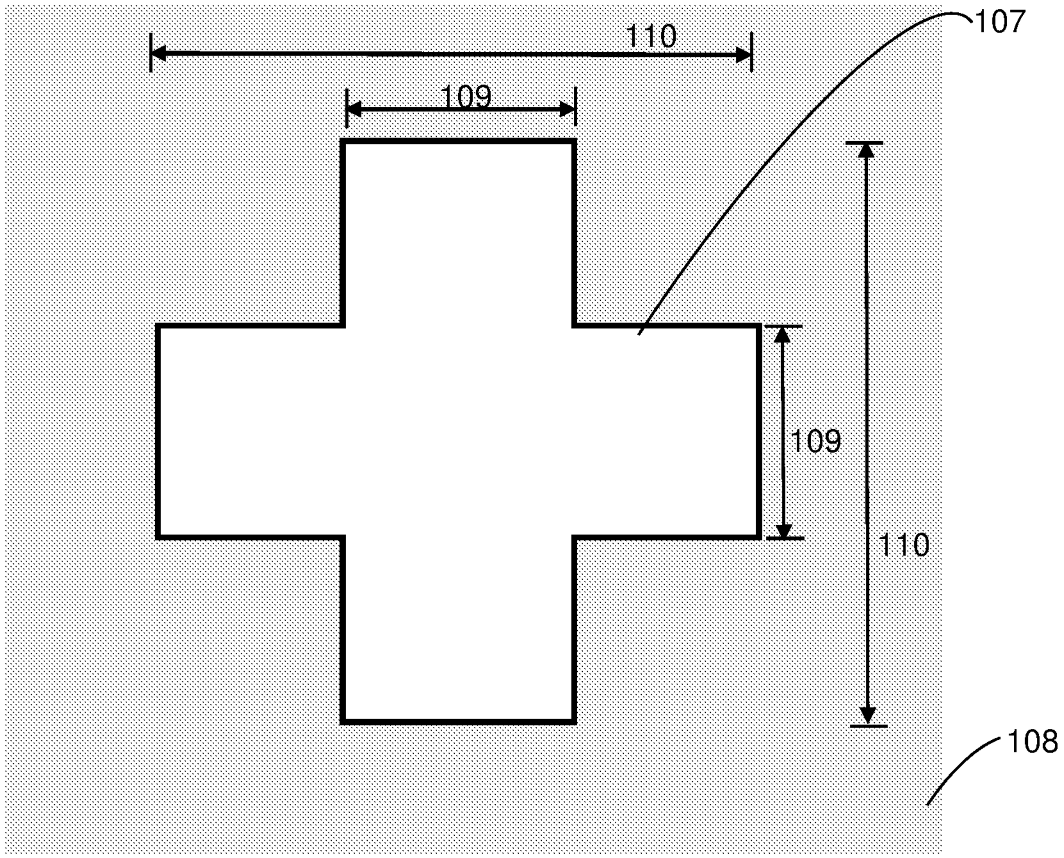
FIG. 1*c* shows a hole of the filter element of FIGS. 1*a* and 1*b*.

FIGS. 1*a*, 1*b*, 1*c*, 2 and 3 show an illustration of an embodiment of a first aspect of the invention. A multispectral image sensor 101 is shown, having a broadband image sensor 102 and a spectral filter 103.

The image sensor 102 has nine pixels 104 arranged in a grid. The image sensor is a Mercury-Cadmium-Telluride based CCD with an operating range of 3.75-15 μm.

The spectral filter has nine filter elements 105, 106 arranged in a gird. The spectral filter comprises two groups of filter elements. The first group of filter elements 105 has the passband centred at 67.5 THz and within the operating range of the image sensor. The second group of filter elements 106 has the passband centred at 26 THz and within the operating range of the image sensor. Filter elements from each group 105, 106 are equidistantly and regularly spaced throughout the filter element in an alternating sequence. Each of the filter elements 105, 106 is aligned with a single pixel 104 of image sensor 102.

The spectral filter 103 is formed from a single sheet of gold film 108 of thickness 100 nm. Each of the filter elements 105, 106 is formed from a portion of the gold film 108. The filter elements are formed from an array of through holes 107 has a plus share and is filed with the dielectric air. The through holes 107 of the filter elements 105 have the following parameters: distance 109 0.1 μm, distance 110 1.55 μm, and separation between the centres of two through holes 2 μm. The through holes 107 of the filter elements 106 have the following parameters: distance 109 0.3 μm, distance 110 4.6 μm, and separation between the centres of two through holes 5 μm.

Figure 2:
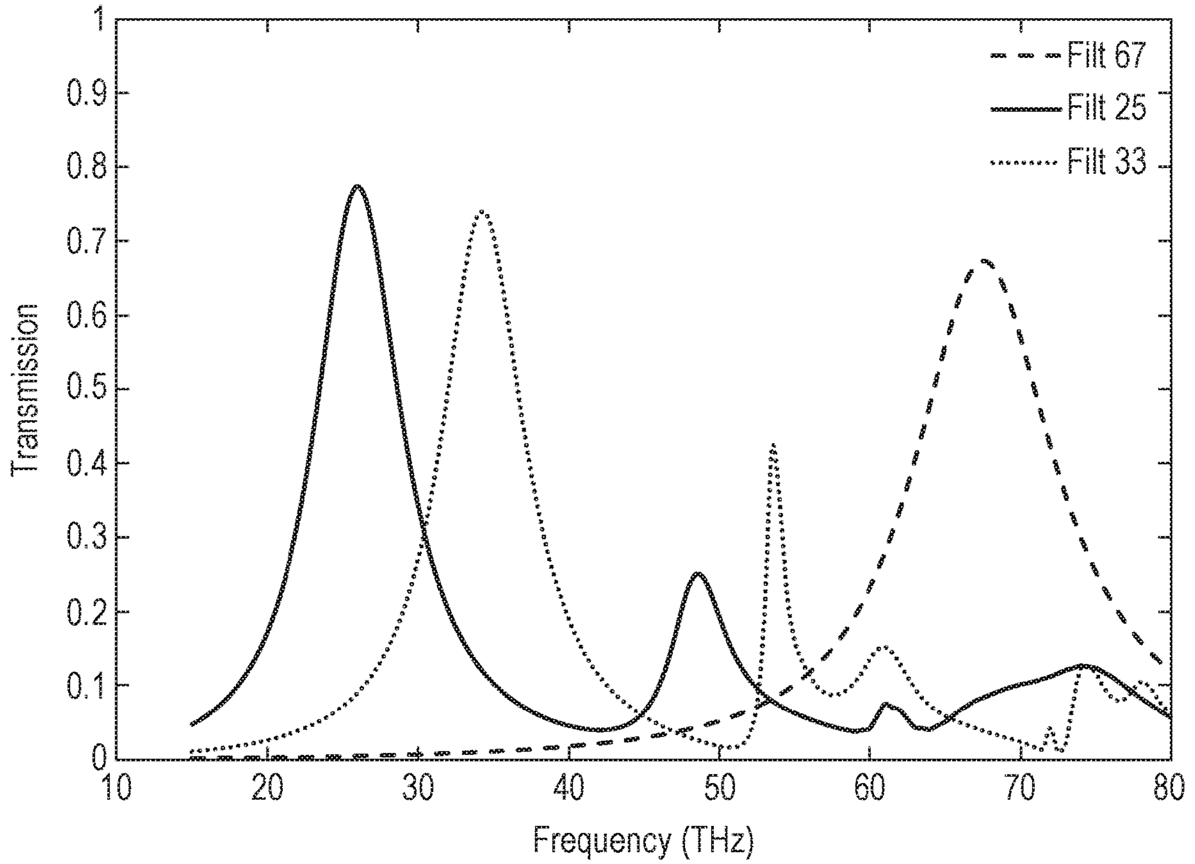
FIG. 2 shows the modelled frequency response of the filter elements of FIGS. 1*a*, 1*b* and 1*c*.
Figure 4:
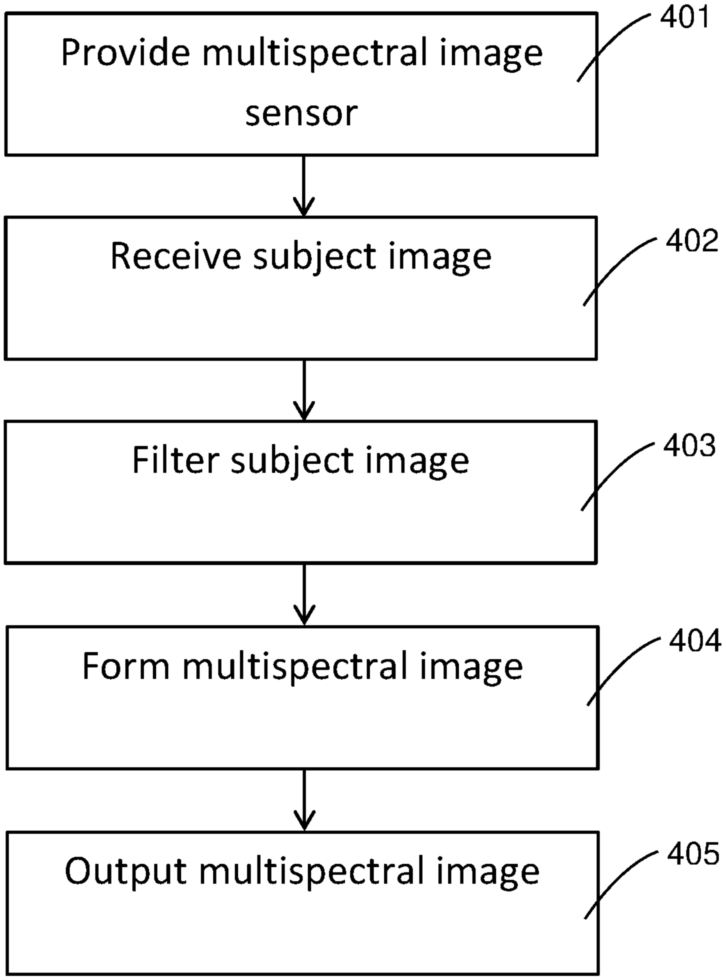
FIG. 4 shows a flow diagram representation of the method according to the second aspect of the invention.

FIG. 2 shows the modelled frequency response of filter elements 105, 106 as Filt 67 and Filt 25 respectively. As can be seen in FIG. 4, filter elements 105 and 106 (Filt 67 and Filt 25) have one dominant transmission peak over the receivable frequency range of the image sensor (2 octaves), with the other peaks falling within a region of low atmospheric transmission (atmospheric stopbands). In particular, there is low atmospheric transmission between ~40 and ~60 THz, with especially low transmission between ~43 and ~55 THz, which is where the secondary filter peaks for filter elements 105 and 106 reside.

Figure 3:
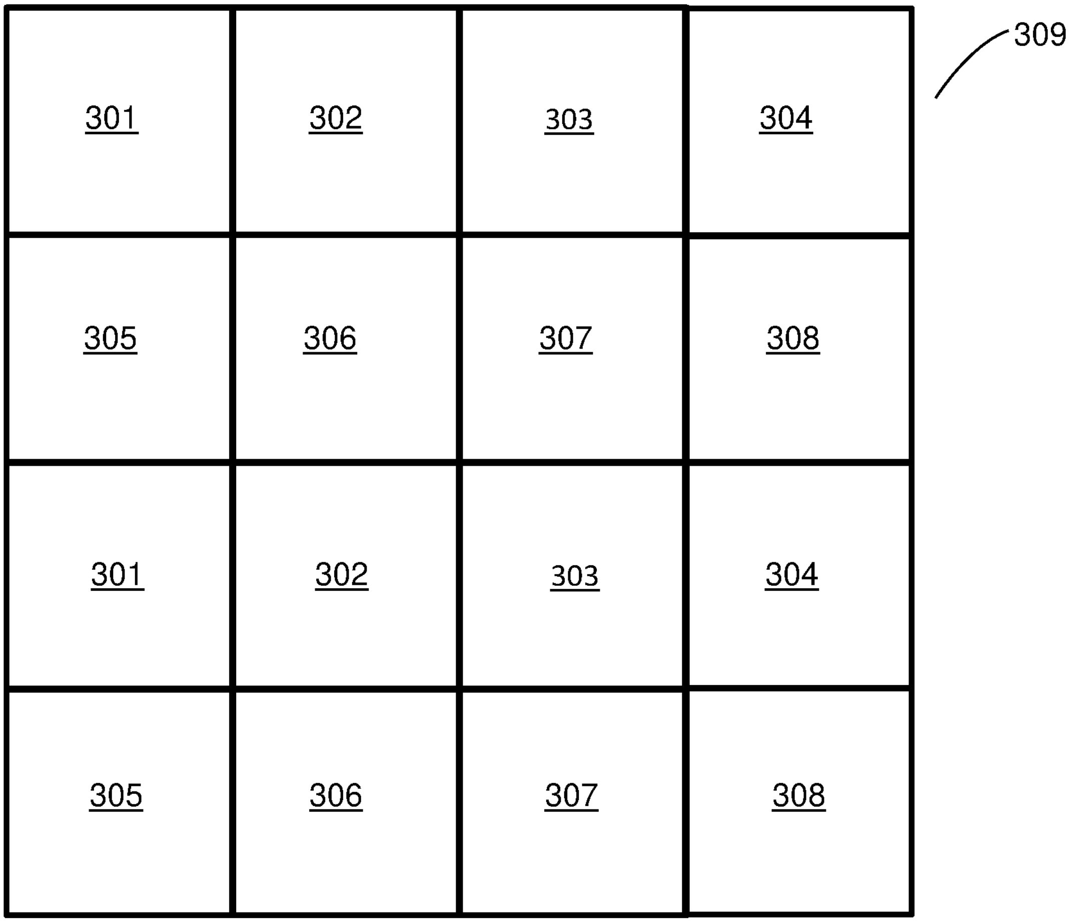
FIG. 3 shows a portion of a spectral filter according to a second embodiment of the first aspect of the invention.

FIG. 3 shows a portion of a spectral filter 309 according to a second embodiment of the first aspect of the invention. The portion of the spectral filter 309 is a repeatable block which is repeated across a whole filter. The spectral filter portion 309 has eight filter elements 301 to 308. Each of the filter elements 301 to 308 have both a selected passband and a selected polarisation state. Filter elements 301 and 303 have the same passband but polarisation states 0 degrees and 90 degrees respectively. Filter elements 302 and 304 have the same pass and but the polarisation states +45 degrees and −45 degrees respectively. Filter elements 305 and 307 have the same passband but the polarisation states −45 degrees and +45 degrees respectively. Filter elements 306 and 308 have the same passband but the polarisation stated 90 degrees and 0 degrees respectively. Each of the sets of filter elements 301/303, 302/304, 305/307 and 306/308 have a different passband.

FIG. 4 shows an illustration of an embodiment of a second aspect of the invention. A multispectral image sensor is provided according to a first aspect of the invention 401.

An image of a subject or scene is received using the spectral filter 402. Each filter element receives a portion of the image.

The spectral filter then filters the subject image to form a filtered subject image 403. Each filter element filters the corresponding image portion to produce a corresponding filtered image portion. Thereby, the filtered subject image is formed from a plurality of filtered image portions. The filtered subject image is received using the broadband image sensor. Each pixel receives the corresponding filtered image portion filtered by the filter element to which the pixel is coupled.

A multispectral image of the object or scene is formed 404. The multispectral image includes the filtered image portions of the filtered subject image.

The multispectral image of the subject or scene is outputted 405.

The invention claimed is:

1. A multispectral image sensor comprising, a broadband image sensor comprising a plurality of pixels arranged in an array and a spectral filter comprising a plurality of filter elements arranged in an array, the spectral filter being mounted to the broadband image sensor such that each of the filter elements is coupled with one or more pixels of the broadband image sensor, each filter element having a passband in a receivable wavelength range of the broadband image sensor, wherein each filter element comprises a film having a negative value of permittivity in the passband of the said filter element, the film comprising a plurality of holes, wherein each hole comprises a dielectric material, and wherein the passband of at least two of the filter elements differ by one or more octaves.

2. The multispectral image sensor according to claim 1, wherein each filter element is tuned to have a single passband in the receivable wavelength range of the broadband image sensor.

3. The multispectral image sensor according to claim 1, wherein the spectral filter comprises two or more groups of the filter elements, and wherein each of the filter elements within a group have a single passband and wherein the passband of each of the groups of filter elements are different.

4. The multispectral image sensor according to claim 3, wherein the filter elements within each group of filter elements have a periodic arrangement within the array.

5. The multispectral image sensor according to claim 1, wherein each of the filter elements has a polarisation state, and wherein the polarisation state of two or more of the filter elements are different.

6. The multispectral image sensor according to claim 5, wherein the polarisation state of at least two of the filter elements within one or more of the group(s) of filter elements is different.

7. The multispectral image sensor according to claim 5, wherein filter elements having the same polarisation state may be periodically arranged within the array.

8. The multispectral image sensor according to claim 5, wherein the each of the filter elements within a group have a single polarisation state and wherein the polarisation state of two or more of the groups are different.

9. The multispectral image sensor according to claim 1, wherein each filter element is coupled with a single pixel of the broadband image sensor.

10. The multispectral image sensor according to claim 1, wherein a cross-section of the holes is cross shaped.

11. The multispectral image sensor according to claim 1, wherein the receivable wavelength range of the broadband image sensor is two or more octaves.

12. The multispectral image sensor according to claim 1, wherein the receivable wavelength range of the broadband image sensor excludes atmospheric stopbands.

13. A camera comprising the multispectral image sensor according to claim 1.

14. A method of producing a multispectral image of an object or a scene, the method comprising the steps of:

(a) providing a multispectral image sensor according to claim 1;

(b) receiving a subject image of the object or scene using the spectral filter, the subject image comprising a plurality of image portions and each filter element receiving a corresponding image portion of the subject image;

(c) filtering the subject image using the spectral filter to produce a filtered subject image, the filtered subject image comprising a plurality of filtered image portions, each filter element filtering the corresponding image portion to produce a corresponding filtered image portion;

(d) receiving the filtered subject image using the broadband image sensor, each pixel receiving the corresponding filtered image portion filtered by the filtered element to which the pixel is coupled;

(e) forming a multispectral image of the object or scene comprising the filtered image portions of the filtered subject image; and (f) outputting the multispectral image of the subject image.

* * * * *